July 26, 1927.
C. ROBINSON
1,637,052
PROCESS OF PRODUCING METALLIC CARBON
Original Filed Aug. 1, 1921
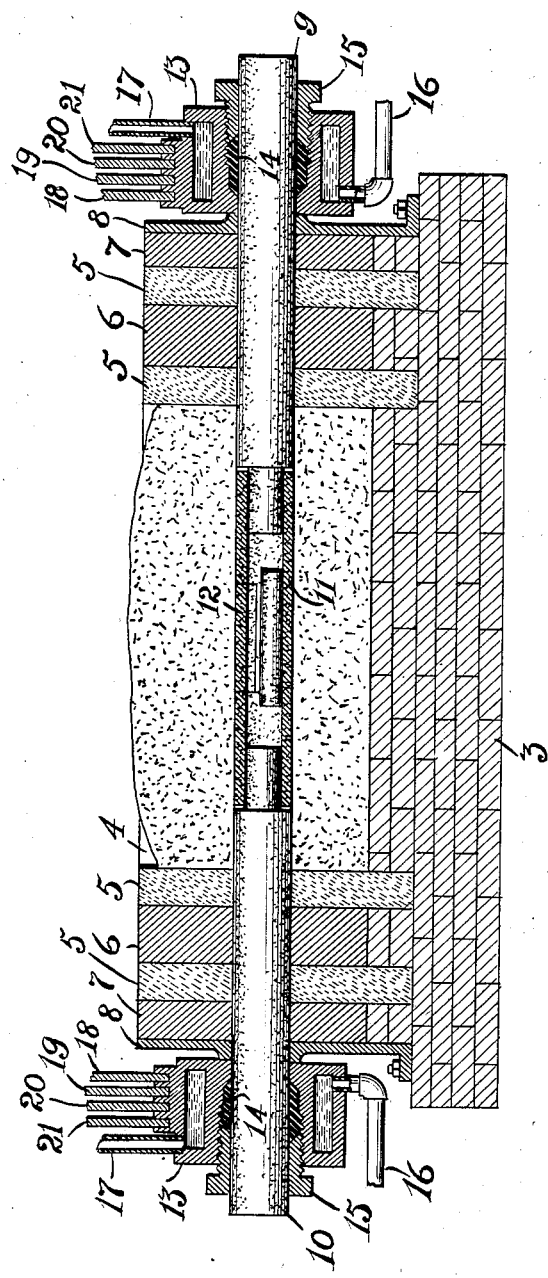
INVENTOR
CONWAY ROBINSON
BY
ATTORNEY Patented July 26, 1927.

UNITED STATES PATENT OFFICE.

1,637,052

CONWAY ROBINSON, OF BALTIMORE, MARYLAND, ASSIGNOR TO WESTINGHOUSE ELECTRIC & MANUFACTURING COMPANY, OF NEW YORK, N. Y., A CORPORATION OF PENNSYLVANIA.

PROCESS OF PRODUCING METALLIC CARBON.

Application filed August 1, 1921, Serial No. 489,107. Renewed December 15, 1925.

The present invention pertains to a process for the production of true and pure metallic carbon, an elemental substance possessing remarkably novel and useful properties, such as malleability, ductility, cohesiveness, and other metallic properties.

I have found that as the ordinary forms of carbon are purified and rendered more continuous or homogeneous in physical structure, they approach more nearly to the true metallic state.

The product of this invention is pure elemental carbon of a metallic nature and may be described in general terms as a metal of lower vapor pressure, I have reason to believe, than the ordinary form of carbon, of comparatively low specific gravity, approximating more or less nearly that of aluminum, of silvery gray color, possessing a metallic lustre and capable of being produced in a malleable, ductile, dense, coherent, homogeneous mass. It may be used in the pure or free state, or alloyed with another metal or other metals and manifestly has a comprehensive usefulness in the domains of metallurgy and chemistry.

It is well known that the usual forms of amorphous carbon and graphite have a negative temperature coefficient. This negative temperature coefficient I consider due to a contact resistance between the particles of impure carbon or graphite, which is reduced as the temperature increases. When the particles of true metallic carbon are pressed into a dense, continuous, homogeneous metallic structure, there is no contact resistance and the entire mass shows a positive temperature coefficient, due to the electrical resistance of the carbon in its metallic state.

The melting point of the pure metallic carbon is very high, somewhat above that of tungsten, in consequence of which, considering also its improved vapor pressure, its employment in the electrical field, notably for the production of electric lamp filaments, electrodes, crucibles and the like, naturally suggest itself and such applications have been made to the extent of indicating the practicability thereof.

This new material, by reason of its malleability, ductility and general workability, its dense, coherent, homogeneous structure, its high melting point and low vapor pressure, make it admirably adapted for a great variety of other uses. In short, it is useful in the arts for all the purposes for which the ordinary form of carbon are now used, and besides being superior in many respects it further occupies a new field of its own.

In my copending application, Serial No. 462,965, filed April 20, 1921, Element, free metallic carbon and the art of producing or extracting same, and assigned to the Westinghouse Electric & Manufacturing Company, I have disclosed a method of producing metallic carbon which may be fabricated into the form of ingots, rods, plates, bars, sheets and the like. I have invented other processes for obtaining the same product and these will form the subject matter of future applications.

It is an object of the present invention to provide a simple, direct and economical chemical process for the production of my new product, i. e., metallic carbon.

Other objects of this invention will be manifest from a reading of the specification.

The heretofore known amorphous forms of carbon, even when they are as pure as chemists have been able to produce, is not the element carbon. I have found that such forms of carbon are chemical compounds of that element usually with a relatively small amount of hydrogen, or with some oxygen, depending upon the carbon compound from which they were made, or upon their exposure to impurities during carbonization.

So far as I am aware, pure elemental metallic carbon, or metallic carbon in the form of ingots, rods, plates, bars, sheets, or the like, is an entirely new product. Metallic carbon in such forms may be readily fabricated by well known methods when produced by the process herein described.

I have invented, developed and practically utilized an art or method of separating from carbonaceous matters the pure or free metallic carbon and devised apparatus suitable to the practice for the carrying out of such art or method. One form of apparatus suitable to carrying out the art, method or process will be shown and described in the present application.

The process and apparatus of the present invention enable me to decompose carbon compounds and to secure from such decomposition the true element carbon which has a metallic nature.

It is necessary for the production of metallic carbon by any process to avoid conditions which may allow even a small amount of impurity to exist in the final product. To attain the requisite degree of purity, the compound from which the product is derived should be freed from foreign substances, the decomposition of the compound and the removal of the by-products should be complete and the process should be carried out in such environment that no contamination of the metallic carbon may occur. After obtaining the metallic carbon by the decomposition of a chemical compound, it is necessary to prevent its recombination with elements such as hydrogen and oxygen, by agglomerating into a dense mass in an inert environment, the metallic carbon which is usually obtained in a porous condition. When the metallic carbon exists in a dense, comparatively non-porous mass, it resists the chemical action of the atmosphere and is thus in a condition for commercial use.

While any carbon compound may be used to yield metallic carbon under the conditions which I have discovered as being necessary for the production of the same, and various means may be employed for effecting the decomposition of such compound, the present application will, for the purpose of illustration, show how metallic carbon may be obtained from a cheap and plentiful ore, namely, anthracite coal, and one means for effecting its decomposition.

Though the metallic carbon may be produced or separated from carbon compounds of different forms by different methods and means, I have thus far obtained satisfactory results through the use of a specially designed electrical furnace which I will now describe.

Referring to the accompanying drawing forming part of this specification, a vertical sectional view of an electric furnace is shown.

In particular the drawing shows a suitable base 3 constructed, for example, of refractory brick upon which are erected end and side walls, to form, in the embodiment illustrated, a rectangular chamber 4. The end walls of this chamber, and, if desired, the side walls as well, are formed of barriers 5 of suitable refractory material, separated by an insulating body or mass 6, which may likewise be of any suitable character. For the end walls at least, a further insulation 7 is placed outside the outer barrier 5, between said barrier and a cast brass plate 8.

Passing horizontally through the end plates, barriers and insulation at opposite ends of the furnace, are solid graphite electrodes 9 and 10, the inner end of each electrode being reduced to enter and fill one end of a graphite resistor tube 11, cut away at its midlength for about one-half its circumference, and provided with a removable cover section 12 to close the opening so formed. The graphite electrodes protrude from the ends of the furnace and beyond the cast iron end plates 8, and each is encompassed by a hollow, annular, water-cooled head or terminal 13, which at the side next the cast iron plate 8 is made to fit the electrode somewhat closely, but from there outward is of larger internal diameter to receive a packing 14 of graphite or other suitable material, which being compressed by a threaded follower 15 screwed into the head or terminal 13, affords good electrical connection between said head and the electrode. Inlet and outlet pipes 16 and 17 serve to lead water or other cooling medium to the interior of the hollow head or terminal, to prevent the same from becoming unduly heated. The reference numerals 18, 19, 20 and 21 indicate electric cables, the ends of which are suitably seated in the heads 13, and serve to bring to the electrodes the necessary electric current.

Preparatory to the treatment of metallic carbon ore in this furnace, the graphite resistor tube 11 is fired in the furnace in the presence of an atmosphere of carbon monoxide. The temperature of this firing is such as to eliminate all impurities from the boat or tube. Into the tube 11 is placed a quantity of anthracite coal, preferably in the form of small pieces and surrounding which is placed a quantity of cellulose, of which raw cotton is an example. The cover 12 is then applied to the opening of the tube 11 and pure graphite in granular or pulverulent form is closely packed about the tube and to a suitable height above it.

Electric current is then brought to the tube 11 from the cables 18, 19, 20 and 21 and said tube is brought to a proper temperature, which is probably in the region of 3500° C. and maintained thereat for such time as may be found by experience to contribute to the highest degree of efficiency, these matters depending particularly upon the particular charge treated, its quality or condition, mass, etc., and of course upon the size and design of the furnace used and on the current employed.

Just what chemical reactions and metallurgical effects occur during the heating of the carbon compound within the resistor tube 11 is not definitely known, but it can be stated that the carbon compound so treated breaks down, the matters other than the pure carbon element being ultimately eliminated, and said elemental carbon or metal being left in a pure and free state. It seems probable that the action of the intense heat serves to volatilize all impurities from the ore and that the action of the cellulose chemically decomposes the chemical compound of metallic carbon. The metallic carbon thus formed is in a comparatively porous condition and it is necessary to render it denser in order to reduce the liability of the metal to recombine with other elements when exposed to the atmosphere. To accomplish this reduction of the surface area the metal may be compressed, sintered, or fused or otherwise worked in an inert environment. While in the fused state it may be cast and subsequently rolled, hammered, drawn, pressed, or otherwise fashioned into a dense, coherent, homogeneous mass.

While I have described the preferred chemical process for obtaining metallic carbon other processes based on the same principles may obviously be suitable but these are intended to be embraced in the appended claims.

In my earlier application Ser. No. 462,965, filed April 20, 1921, I have set forth and claimed as my discovery the new product, metallic carbon, and the production thereof through heat treatment. I have also set forth in said application the furnaces and apparatus whereby such heat treatment is practically carried out. No claim is herein made to the product or element, pure or free metallic carbon, or to the furnace illustrated in the drawing forming part of this application, or to the process set forth and claimed in application Ser. No. 462,965, the same being reserved for said earlier application and other pending applications directed specifically to such furnaces, apparatus and process.

What is claimed is:

1. The process of producing elemental metallic carbon, which consists in subjecting a substance containing carbon to a high temperature in the presence of cellulose, removing all substances except the true elemental carbon thus produced, and subsequently working said elemental carbon into a dense, coherent, homogeneous mass in an inert environment.

2. The process of producing metallic carbon, which consists in subjecting a carbon compound to a high temperature in the presence of cellulose, removing all substances except the true elemental carbon and subsequently working said elemental carbon into a dense, coherent, homogeneous mass in an inert environment.

3. The process of producing metallic carbon, which consists in subjecting anthracite coal to a high temperature in the presence of cellulose, removing all substances except the true elemental carbon and subsequently working said elemental carbon into a dense, coherent, homogeneous mass in an inert environment.

4. The process of producing metallic carbon, which consists in subjecting anthracite coal to a high temperature in the presence of cotton, removing all substances except the true elemental carbon and subsequently working said elemental carbon into a dense, coherent, homogeneous mass in an inert environment.

5. The process of producing metallic carbon, which consists in subjecting anthracite coal to a temperature of the order of magnitude of 3500° C. in the presence of cotton, removing all substances except the true elemental carbon thus produced and subsequently working said elemental carbon into a dense, coherent, homogeneous mass in an inert environment.

6. The process of producing true elemental carbon, which consists in reducing a substance containing carbon by subjecting said substance, in the presence of cotton, to heat generated by the passage of electric current through a refractory resistor containing said substance, said resistor being placed in a chamber sealed to the atmosphere, withdrawing from said chamber all impurities and subsequently working said elemental carbon into a dense, coherent, homogeneous mass in an inert environment.

In testimony whereof, I have hereunto subscribed my name this 30th day of July, 1921.

CONWAY ROBINSON.